Nov. 5, 1935.  H. M. LOFTON  2,019,919
FIRE HYDRANT
Filed Dec. 8, 1931  3 Sheets-Sheet 1
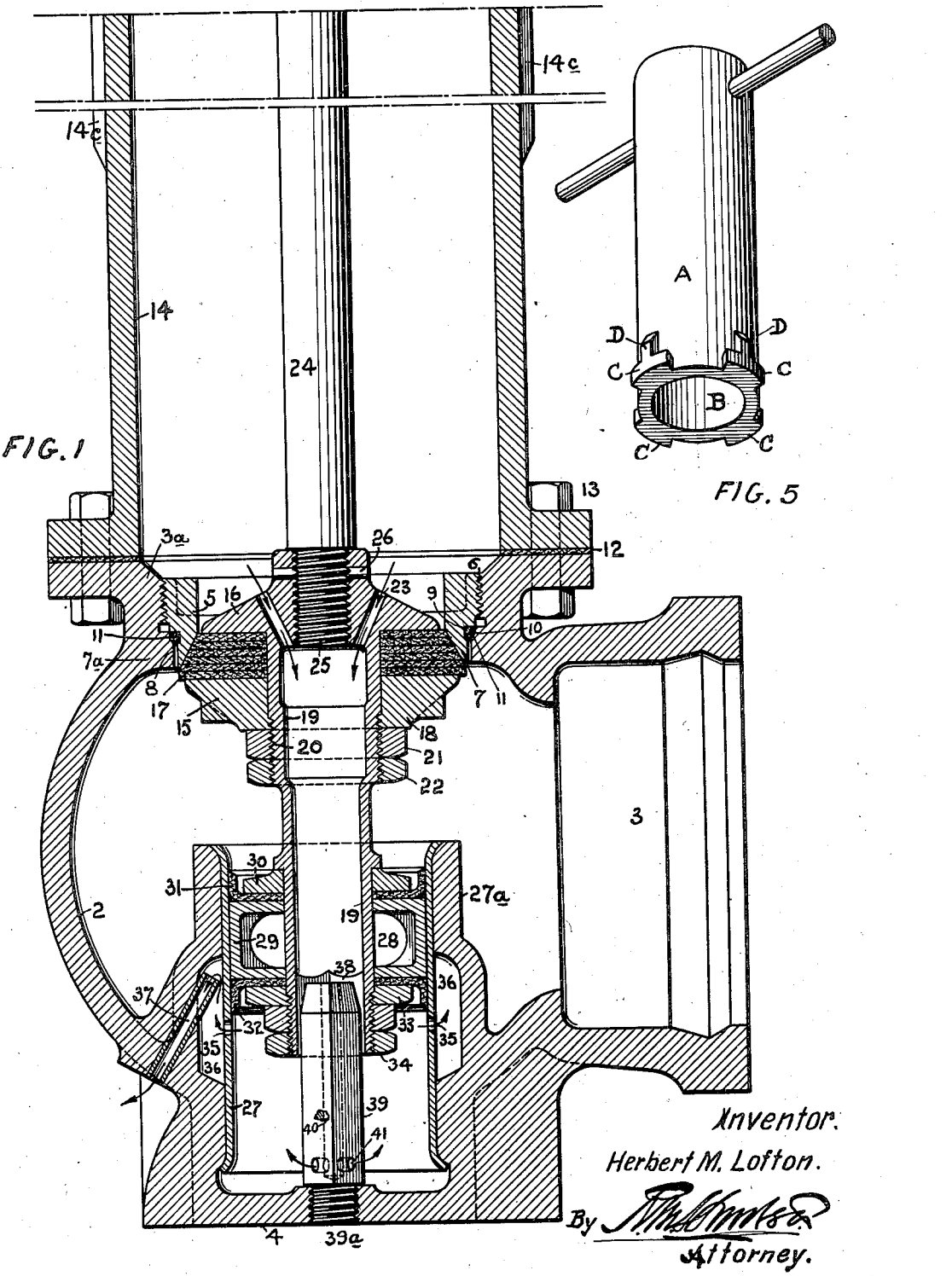
Inventor.
Herbert M. Lofton.
By  Attorney.

Nov. 5, 1935.  H. M. LOFTON  2,019,919
FIRE HYDRANT
Filed Dec. 8, 1931  3 Sheets-Sheet 2
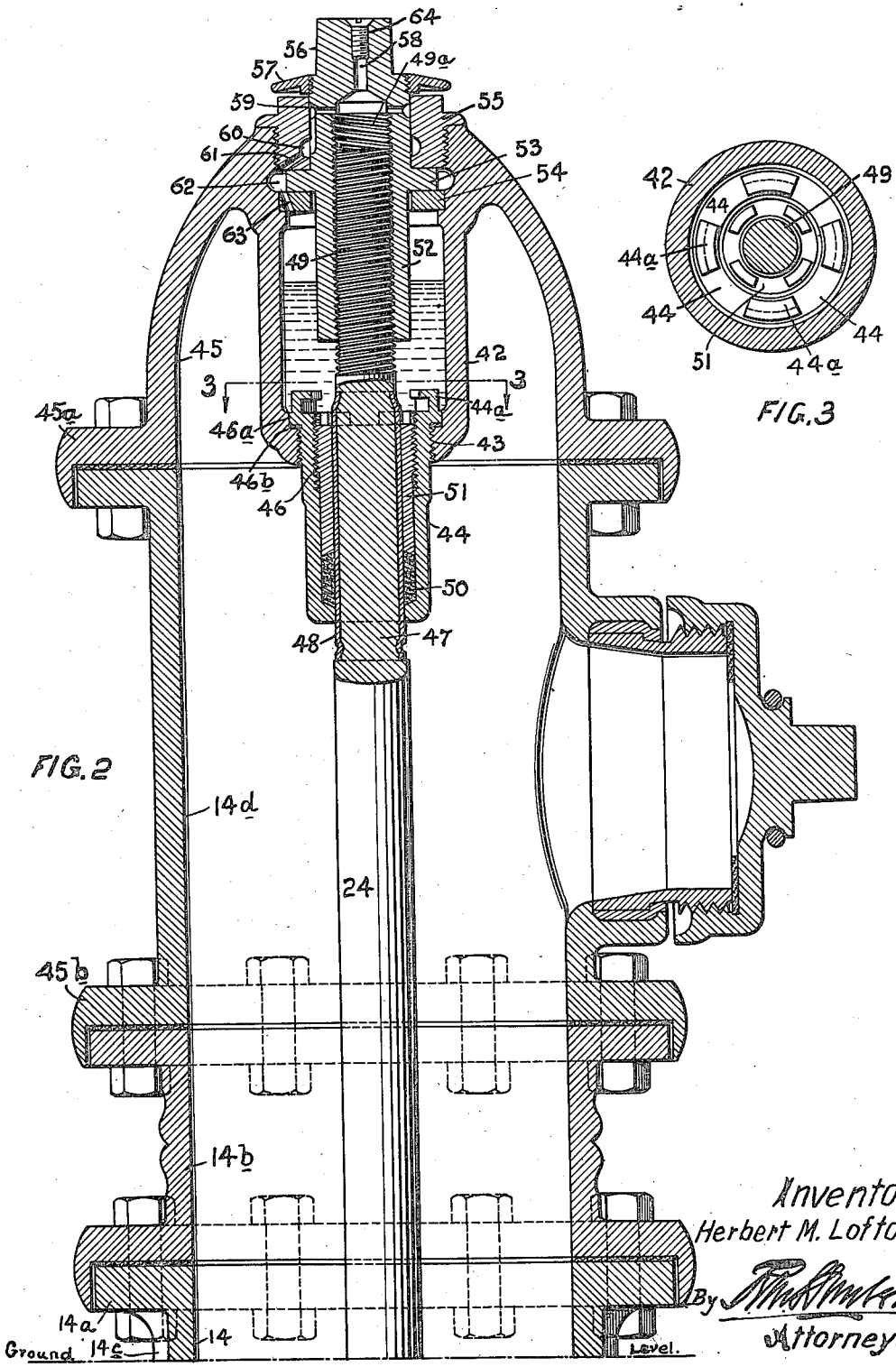
Inventor.
Herbert M. Lofton.
By
Attorney.

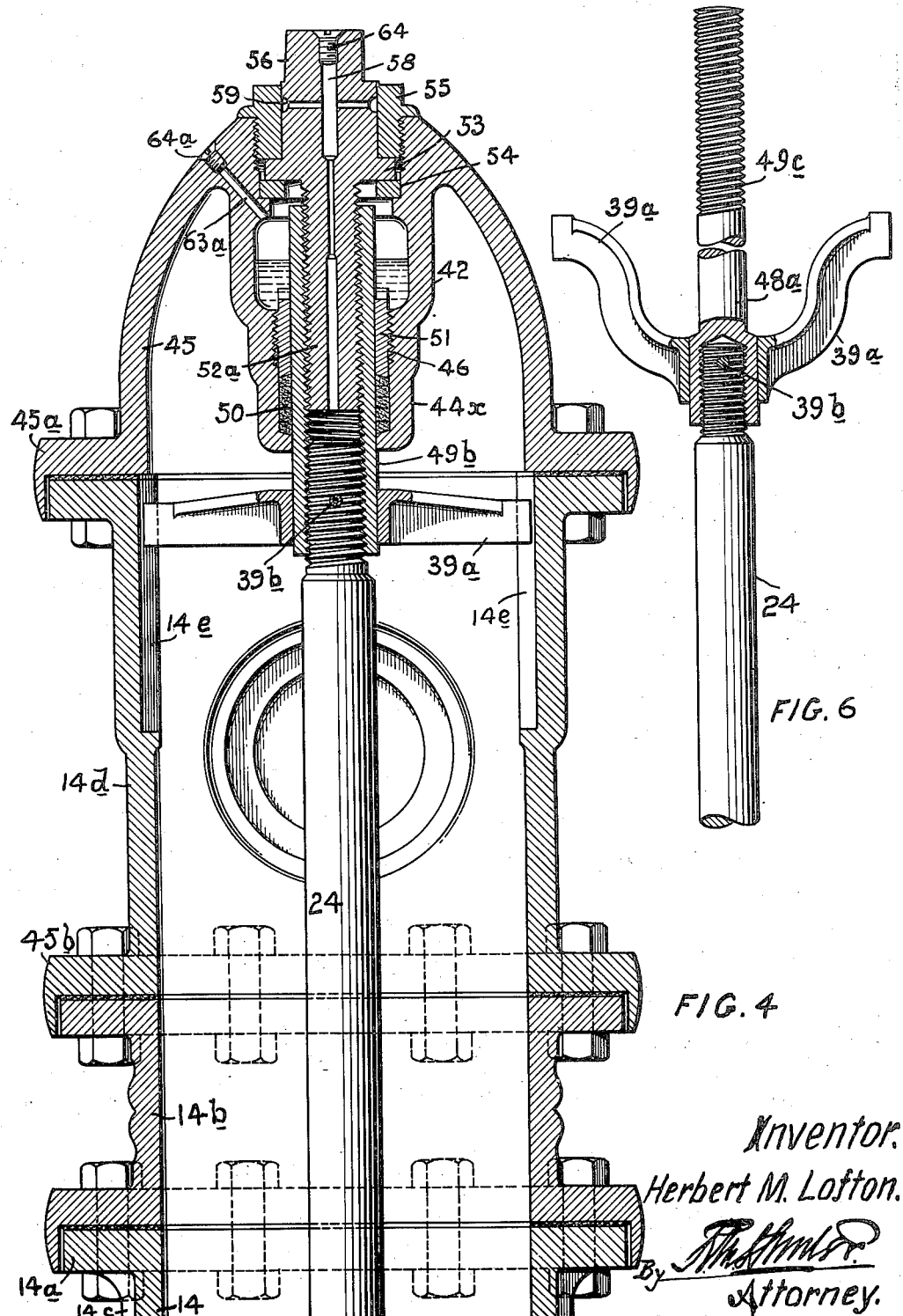

Patented Nov. 5, 1935

2,019,919

UNITED STATES PATENT OFFICE 2,019,919

FIRE HYDRANT

Herbert M. Lofton, Chattanooga, Tenn.

Application December 8, 1931, Serial No. 579,683

15 Claims. (Cl. 137—13)

The improvements hereinafter set out relate to constructive features of hydrants generally known as "fire hydrants", and more particularly comprise features of construction having to do with the lubrication of the upper mechanism thereof, whereby it is capable of more easy operation in the opening and closing movements.

More especially, my invention has for an object the provision of an oil reservoir, preferably depending within the bonnet of the hydrant stock or barrel and provided with a detachable bottom and stuffing box through which the valve operating stem or extension thereof may be movable when opening or closing the main valve, said stuffing box portion being removable from the bottom of the oil reservoir and through the top of the bonnet when the stem operating nut is removed.

My invention also comprehends certain features relating to means employed to permit a vertically reciprocable movement of the valve stem while preventing its rotation, said means formed as an extension or stub-shaft secured to the valve stem by a transverse pin or otherwise and providing a cross arm, the free ends whereof are guided in vertical guide grooves upon the inside of the barrel portion. In practice, the extension or stub-shaft may be conveniently formed to screw inside of the operating stem nut of the hydrant or, reversely, it may be formed as a tubular part with which a threaded stem nut may be engaged for reciprocating the valve and its stem.

My invention also includes a valve stem having adjacent to and upon its upper end a sleeve or covering of non-rustable metal and resistant to corrosion, such as bronze monel metal or rustless steel, either mechanically applied thereto or provided by electro-deposition with heavy plating. The last above specified structure may be in the form of an extension or stub-shaft making a screw threaded engagement with the stem nut, but in this case, suitable provision must be made to prevent rotation of the valve stem, whether made within the barrel or in the elbow or shoe.

According to the invention, the hydrant which has stock and bonnet parts, a main valve, and a reciprocating valve operating shaft, has its bonnet formed with internal depending means providing an oil reservoir, a passage through said means for said shaft, and packing in said means to prevent the escape of oil from said reservoir.

The drawings illustrate embodiments of the invention and the views therein are as follows:

Fig. 1 is a vertical section axially through the lower portion of the hydrant;

Fig. 2 is a similar vertical section made through the upper part of the hydrant;

Fig. 3 is a transverse section through the reservoir portion, taken on line 3—3 of Fig. 2;

Fig. 4 is a vertical section of the upper portion of a hydrant of my invention, showing a modification of the structure of Fig. 2;

Fig. 5 is a perspective view of a socket wrench for inserting and removing the stuffing box of the oil reservoir, said wrench being for use in screwing the stuffing box into or out of position within the oil reservoir; and Fig. 6 is a side view, with part in section, of a modified form of the extension or stub shaft.

2 is the body of the shoe and is made flat on the bottom portion 4 thereof. The shoe is provided with a lateral tubular flange portion 3 adapted for making connection with the supply main in the street. The upper portion 3a of the shoe is flanged and bolted to the flanged lower end of the stock 14 by bolts 13 and with a packing 12 interposed between the flanges. The upper opening in the shoe is screw threaded as at 6 into which the seat ring 5 is screwed, and said seat ring has its lower conical seating portion 7 extended downward below the screw threaded portion and formed with a slight clearance 8 from the vertical wall 7a. At the upper end of the juncture 8 of the parts 7 and 7a, there is provided an annular groove extending part-way into the seat ring and part-way into the flanged end 3a of the shoe, the grooved portion 9 extending into the seat ring and the groove 10 extending into the flanged end of the shoe. When the seat ring 5 is screwed down into the flanged end 3a of the shoe, the gasket 11 normally of rectangular or square shape in cross section is caused to assume a different shape by co-action between the walls 9 and 10 of the annular groove. It is manifest that the lead or other gasket is caused to be pressed tightly into the recess 9 in the seat ring, and forms an interlock with the gasket so that when the seat ring is unscrewed upward and removed, it carries with it the said gasket 11. This gasket 11 fits tightly into the undercut part of the seat ring portion and fits the grooved portion 10 of the shoe in such a manner as to permit immediate separation therefrom upon screwing the seat ring upward for removal. In other words, the gasket becomes firmly attached to the seat ring and readily detached from the upper flanged portion 3a of the shoe. From Fig. 1, it will also be seen that the greatest diameter of the gasket in the seat ring 5 is equal to or less than the diameter of the threads 6 of the flanged portion 3a of the shoe, so that the gasket is in no way injured by removal and re-insertion of the seat ring.

15 is the main valve and comprises an upper disk-like body 16 having formed integral therewith a downwardly extending tubular shaft portion 19, a series of disks 17 of leather or other suitable material forming a tapered packing adapted in shape to fit the beveled seat 7 of the seat ring 5, and a bottom annular plate 18 fitting loosely over the tubular shaft 19 and clamped in position thereon by means of clamping nut 21 and lock nut 22 screwed upon the threaded portion 20 of the tubular shaft. In this manner, the packing of the main valve may be tightly clamped together between the two metal parts 16 and 18. The operating shaft or valve rod 24 has a screw threaded end 25 which is screwed into the upper disk-like body 16 of the main valve and is pinned therein by a transverse pin 26 so that said shaft and valve piece move as a unit and without rotation.

23 are ports or passages from the space at the bottom of the stock 14 and downward and into the hollow passage portion of the tubular shaft 19. The lower end of the tubular shaft 19 is made square as indicated at 38 and this is normally in sliding contact with the stationary upright bronze stud or post 39 which is screw threaded at its bottom portion 39a into the base of the shoe. In this manner, the main valve and its operating stem or shaft 24 is permitted to have vertical movement but prevented from being rotated. The interior of the shoe and the bottom portion thereof is provided with a cylindrical casting 27a which is internally fitted with a bronze bushing 27 of tubular like form and preferably with outwardly curved upper and lower ends as shown. This tubular bushing 27 is provided about half way up with lateral drainage apertures 35, said apertures opening into an annular drainage chamber 35 formed between the casting 27a and the annular bushing, the said annular drainage space 36 extending considerably above the aperture 35 and having a drainage tubular portion 37 whose upper end opens into the upper portion of the annular space 36 and providing an outlet from said space at a considerable distance above the drainage aperture 35.

Surrounding the tubular shaft 19 and movable with it is a fluid tight piston 28, said piston forming an annular spacing circular body having clamped between said body and a washer plate 30 a cup shaped leather packing 31. Similarly, at the bottom of the piston spacing circular body is arranged a downwardly extending leather cup packing 32 which is clamped in position by the clamping plate 23 and nuts 34 screwed upon the lower end of the tubular shaft 19. The cylindrical bushing 27 is axially in perfect alinement with the axis of the main valve so that it acts to positively guide the main valve and its attached piston axially of the valve seat.

The drainage water from the stock or barrel 14 of the hydrant flows by gravity through the orifices 23 in the upper annular body part 16 of the main valve, said water flowing downward through the tubular shaft 19 and thence through the vertical passage 40 through the stud and out by the lateral ports 41 into the cylinder 27 below the piston 28 therein. The level of this drainage water rises in the said cylinder 27 and passes outwardly through the lateral port 35 therein and thence through the annular space 36 and into the upper open end of the tubular drain portions 27, the upper end thereof being at or somewhat higher than the lower cup shaped packing 32 of the piston 28. In this manner, the leather packing is maintained submerged in the waste water from the hydrant, and if, for any reason, the hydrant was out of use for a long period, the water in the lower part of the cylinder 27 will be retained at a level which will be above the said packing 32 and consequently keep it in a moist and pliable condition. It is also evident that if the hydrant is in connection with a source of water supply, the entire shoe would be filled and water would have access to the upper cup shaped packing 31, and in that manner maintain the same in a pliable and workable condition.

The piston 28 being positively connected with the main valve 15 and spaced therefrom, said parts are each adapted to be subjected to the pressure of the water supply entering the shoe, said pressure operating upon the underside of the main valve 15 and upon the upper side of the piston 28. By reason of this construction, the main valve is substantially counter-balanced by the piston 28 and greatly reduces the amount of effort required to open the main valve. The main valve is somewhat larger in diameter than the diameter of the piston 28 of the counter-balance and waste valve. While it is desirable to have some excess pressure to normally hold the main valve closed upon its seat, it is equally desirable that the excess pressure be reduced to an amount only sufficient to insure a tight valve and, at the same time, to be limited to such an extent that the counter-balance effect operates to reduce the power necessary to open the valve to a minimum. The counter-balance feature of my improvements, while being of the same nature as shown in my Patent Number 1,717,392, dated June 18, 1929, in association with other features of improvements, is important and insures desirable results in the structure herein over and above what is illustrated in my said patent. While the valve may be opened to any degree desired, its total movement is limited by the contacting between the under part of the annular plate 18 of the main valve and the upper rim of the cylindrical casting 27a and bushing 27 thereof.

Aside from the functions of the parts illustrated in Fig. 1 acting as a means for counter-balancing the main valve 15 to facilitate its opening and closing movement, I have arranged for holding the main valve concentric with the seat ring 5 by employing the balanced valve cylinder 27 precisely in line with the valve seat, this being accomplished by means of the spacer or piston 28 fitting fairly within the said balanced valve cylinder 27 through the connections 19 between said piston or spacer and the main valve itself. The advantages of this arrangement are highly important for the reason that it removes all cross obstructions from any point above the valve opening, thereby permitting unimpeded flow of water when the main valve is opened. The drain is entirely automatic and requires no synchronized or screw adjustment of any kind and is entirely proof against derangement for the reason that when the main valve is closed the lower cupped leather 32 rises sufficiently above the hole 35 in the bronze casing or cylinder 27, thereby permitting the water to flow out from the point above the main valve of the hydrant through the openings 35, as previously pointed out.

Referring more particularly to Fig. 2, illustrating the upper portion of the hydrant and especially those portions above the ground level, the following features may be enumerated. At the upper end of the stock or barrel 14 there is fitted an annular section 14b of relatively short vertical height and of a more or less weak condition relatively to the strength of the stock or body part 14 which extends into the ground and also with respect to the short stock or body portion 14d provided with the nozzle openings immediately above it, the purpose and object of which weakened part 14b being that, in case of a severe impact by collision of a heavy truck or car, the said weakened portion will be ruptured before any damage would be done to the main stock or barrel and the nozzle bearing upper stock or body portion. This weakened section 14b is flanged at its lower part to form a flanged joint connection 14a with the upper end of the main barrel or stock 14 which is also reinforced by fillet or rib portions 14c. Likewise, the upper flanged end of the weakened section 14b is bolted to the lower flanged end of the nozzle section 14d as indicated at 45b.

45 represents a bonnet or head which is bolted to the upper flanged end of the nozzle section 14d, as indicated at 45a, and carries the mechanism or means for operating the valve stem or rod 24 and also for lubricating the operative devices therefor.

Keeping in mind that the lower end of the valve stem or shaft 24 is held against rotation, as hereinbefore described in connection with Fig. 1, the upper end of the valve stem 24 is screw threaded at 49 and engages the interiorly threaded portion 49a of an operating nut 52 having an annular flange 53 and a polygonal upper and outer portion 56 for the reception of a wrench or suitable device for rotating it, as in opening and closing the valve. The inner portion of the bonnet is provided with an annular shoulder upon which an annular plate 54 rests, said plate receiving and supporting the annular flange 53 of the nut. Immediately above the flange 53 of the nut is an annular bushing 55 screwed into the top of the bonnet and also forming a bearing for the nut portion. In this manner, the nut is revolvable within the bushing and is held against vertical movement upwardly or downwardly by reason of its annular flange arranged between the plate 54 and bushing 55. Screwed upon upper portion of the nut is an annular hood 57 which operates to shed water due to rain or other cause and prevent it entering the working joints between the nut and the bushing 55.

An oil reservoir 42 extends downwardly within the bonnet 45 and is provided at its lower end with a cup portion 44 having within it a suitable packing 50 and gland 51, the latter being screw threaded into the cup at 46 to provide the necessary pressure upon the packing 50. The cup 44 is screwed into the lower part of the oil reservoir 42, as indicated at 43 and, moreover, the said cup is provided with an annular flange 46a which clamps down upon a packing ring 46b to make an oil tight joint. The valve stem or shaft 24 at its part 47, intermediate of its main portion and the screw threaded upper end 49 thereof, is provided with a tightly fitting sleeve 48 of bronze or other non-rustable or corrodible metal which is flanged into tight relation with the stem or shaft and forms thereby a smooth operating portion which extends upwardly through the packing 50 and gland 51. In practice, it is desirable to provide this bronze or other sleeve upon and movable with the valve stem, though, if desired, for cheapness, the valve stem itself may be turned to the right diameter to properly cooperate with the gland and packing. It is also understood that in place of a sleeve 48 being applied to the valve stem, the said sleeve portion may be formed by electrical deposition.

In the particular illustration, I have indicated the following means for supplying oil into the reservoir without having to open up the upper part of the bonnet, said means comprising a vertical aperture 58 through the top of the nut and which may normally be closed by a screw 64. From the central aperture 58, the oil will find its way down upon the screw threaded portions 49 and 49a. The excess of oil will then flow laterally through apertures 59 in the nut and thence downward into the annular grooved portion 60 inside of the bushing 55, thereby lubricating the working parts between the nut and the bushing. The oil further passes from the annular groove 60 through oblique passage 61 in the bushing into the annular space 62 about the flange 53 of the nut and thence by passage 63 through the annular plate 54 into the oil chamber of the reservoir 42. Moreover, the screw threaded portions of the stem and nut which project into the oil in the reservoir operate under capillary action to induce an upward flow of oil to keep these parts well lubricated. Oil may be supplied to the reservoir in any other suitable manner.

If it is desired to adjust the gland 51 for putting more or less compression upon the packing 50, or should it be desired to withdraw the cup 44 together with the packing and gland, this may be accomplished by removing the hood 57 and the bushing 55. Thereafter, the nut 52 may be unscrewed from the top of the threaded valve stem, the plate 54 removed, and the socket wrench shown in Fig. 5 inserted through the upper part of the bonnet into engagement with the lugs 44a of the cup 44. The rotation of the socket wrench engages the lugs 44a in such manner that they rotate the cup 44 and when it is disengaged from the reservoir 42, the socket wrench may lift the said cup together with its gland and packing vertically through the reservoir 42 and out of the bonnet. The character of the socket wrench is clearly indicated in Fig. 5 in which A represents the tubular body portion of the wrench, B its interior aperture, C the flange portions at the bottom of the wrench and D lugs above the flange portion. When this wrench is inserted for engagement with the lugs of the cup 44, the flange portions C descend between the lugs 44a of the cup and when the wrench is rotated said flanged portions C project under the lugs 44a while the lugs D of the wrench abut against the ends of the lug portions 44a of the cup and positively rotate the cup in a right handed or left handed direction for engaging it with the bottom of the reservoir or disengaging it therefrom, as the case may be. The flange portions of the socket wrench also perform the function of providing means by which the cup may be suspended when withdrawing it or inserting it with respect to the lower part of the oil reservoir 42.

While the construction at the upper part of the hydrant and shown in Fig. 2 is the preferred form in respect to the oiling means and the upper portions (normally above the ground level) and preferably also associated with the means for preventing rotation of the valve and valve stem, shown in Fig. 1, I have further shown, in Fig. 4, a modification of my improvements wherein the oiling means is arranged in the bonnet and the reservoir is formed with the cup integral therewith; and I have also shown in this modification, means adjacent to the upper part of the hydrant and preferably immediately below the bonnet thereof for preventing the rotation of the valve stem or shaft while permitting its reciprocation, and will now describe this modification.

In Fig. 4, the general construction of the main barrel or stock 14, the weakened or rupturing section 14b of the barrel or stock, and the nozzle-carrying section 14d of the barrel or stock, are all more or less similar to the construction shown in Fig. 2 and will need no further description. The bonnet 45, however, while provided with the oil reservoir 42 and an operating nut 52a, has the cup shaped portion 44x carrying the gland 51 and packing 50 integrally formed with said oil reservoir 42. The upper end of the valve stem 24 is screwed into an internally screw threaded sleeve 49b and said sleeve operates as a stub shaft or extention of the said valve stem. The sleeve or extension 49b provides a socket internally screw threaded for engagement with a shank portion of the operating nut 52a, and by means of which the said sleeve or stub shaft 49b together with the valve stem are given vertical reciprocating movements. To prevent the valve stem and the sleeve 49b from rotating under the action of the nut, I provide a transverse arm 39a formed with a hub part fitting snugly upon the sleeve or stub shaft 49b and to which parts it is secured by a transverse rivet or pin 39b. The outer ends of the transverse arm 39a are guided in vertical groove 14e on diametrically opposite sides of the interior wall of the barrel part 14d. The nut 52a is, therefore, free to be rotated by the application of a wrench applied to the polygonal head 56; and as the collar or annular flange 53 thereof is held by the fixed annular flange 54 and bushing 55, the rotation of the nut 52a causes a vertical movement to the valve stem 24, which is held against rotation by the transverse arm 39b and guides 14e.

The outer portion of the stub shaft or sleeve 49b is made smooth and forms a good oiled sliding joint with the gland 51 and packing 50, and thereby provides an oil tight closure for the bottom of the oil reservoir 42.

The oil reservoir may be supplied with oil through a passage 63a, normally closed by a screw plug 64a; and the nut may be oiled by squirting lubricant down the vertical hole 58 after the screw plug 64 has been removed, part of the oil finding its way down to the screw threaded union between the parts 49b and 52a, and other portions of the oil passing through the radial passages 59 and about the outside of the nut portion to insure good lubrication.

To permit adjustment of the gland 51 and replacement of the packing 50, if necessary, the bushing 55 may be removed, the nut parts 52a, 53 and 56 then unscrewed upward and withdrawn, and finally the annular flange 54 lifted out. After the removal of these several parts, a suitable socket wrench, as before described, may be inserted to engage the gland 51 to readjust or to remove it, as may be desired.

If desired, the valve stem 24 may be provided with a stub shaft 48a (Fig. 6) having a threaded socket portion screwed upon the upper end of the valve stem and also having its upper end screw threaded as at 49c, in Fig. 6, for engagement with the nut 52, as shown in Fig. 2. In this case, the stub shaft is provided with a transverse arm 39a and rigidly connected with the valve stem 24 by a pin 39b, as in Fig. 4.

The present invention is more particularly directed to the lubricating features of the upper portion of the hydrant, with suitable means for holding the valve stem from rotating during vertical reciprocation, whether said means is located in the lower portion of the hydrant, as in Fig. 1, or in the upper portion thereof as in Figs. 2 or 4, or in any other manner. I, however, do not claim in this application the special features within the shoe 2, as they are subject matter of my Patent No. 1,717,392, dated June 18, 1929, and of my applications Serial No. 561,338, filed September 5, 1931, and Serial No. 574,284, filed November 11, 1931.

Of course, the fire hydrant illustrated and described herein may be modified and changed in various ways without departing from the invention set forth and hereafter claimed.

Having thus described my invention, what I claim and desire to secure by Letters Patent is:

1. In a hydrant of the character described, the combination of stock and bonnet parts with a valve to control the flow of water through the stock, a reciprocating shaft for operating the valve, an oil reservoir formed by a part depending from the upper part of the bonnet and surrounding the shaft, a cup portion provided with packing means to form a liquid tight joint between the shaft and cup portion to prevent water from entering the oil reservoir, said cup being detachable with respect to the bottom of the oil reservoir through which the shaft reciprocates vertically, and rotatable means mounted in the bonnet and extending into the oil reservoir for imparting vertical reciprocations to said shaft.

2. In a hydrant of the character described, the combination of stock and bonnet parts with a valve to control the flow of water through the stock, a reciprocating shaft for operating the valve, oil reservoir extending downward from the upper part of the bonnet and surrounding the shaft, a cup portion provided with packing means to form a liquid tight joint between the shaft and cup portion to thereby prevent water from entering the oil reservoir, said cup being detachable with respect to the bottom of the oil reservoir through which the shaft reciprocates vertically, and rotatable means mounted in the bonnet and extending into the oil reservoir for imparting vertical reciprocations to said shaft, said cup-shaped part provided with lugs on its upper end to be engaged by a socket wrench to rotate the said cup relatively to the bonnet and reservoir, means for supporting the rotatable means, said last means being removable for withdrawing said rotatable means to provide an opening through the upper end of the bonnet of greater diameter than the cup, whereby the cup may be removed or inserted through the upper part of the bonnet.

3. In a hydrant of the character described, the combination of stock and bonnet parts with a valve to control the flow of water through the stock, a reciprocating shaft for operating the valve, an oil reservoir extending downward from the upper part of the bonnet and surrounding the shaft, a cup portion provided with packing means to form a liquid tight joint between the shaft and cup portion to prevent water from the stock entering said oil reservoir, said cup being detachable with respect to the bottom of the oil reservoir through which the shaft reciprocates vertically, rotatable means mounted in the bonnet and extending into the oil reservoir for imparting vertical reciprocations to said shaft, said reservoir being integral with the upper part of the bonnet and providing an enclosed oil carrying space, said rotatable means comprising a nut having a screw-threaded engagement with the upper end of the shaft, and detachable means for holding the said nut in operative relation with the valve shaft and which together with said nut is removable for the purpose of adjusting, inserting or removing the cup-shaped part with its associated packing.

4. In a hydrant of the character described, the combination of stock and bonnet parts with a valve to control the flow of water through the stock, a reciprocating shaft for operating the valve, an oil reservoir extending downward from the upper part of the bonnet and surrounding the shaft, a cup portion provided with packing means to form a liquid tight joint between the shaft and cup portion to prevent water from the stock entering said oil reservoir, said cup being detachable with respect to the bottom of the oil reservoir through which the shaft reciprocates vertically, and rotatable means mounted in the bonnet and extending into the oil reservoir for imparting vertical reciprocations to said shaft, said rotatable means being journaled in the upper part of the bonnet and provided with oil passages therethrough for supplying oil to the reservoir.

5. In a hydrant, a main valve and a shaft for opening and closing same, said shaft provided with a smooth finished sleeve of uniform diameter fitting tightly about and movable with the shaft, in combination with an oil reservoir formed by a portion extending downward from the upper part of the bonnet and directly supplying oil to the smooth portion of the shaft, a liquid tight packing surrounding the smooth portion of the shaft and through which the said smooth portion reciprocates to prevent water from the stock entering said oil reservoir, means within the oil reservoir for compressing the packing, and rotatable means mounted in the bonnet and extending into the oil reservoir for providing a mechanical connection with the shaft for imparting vertical reciprocations thereto.

6. In a hydrant, a main valve, a shaft for opening and closing same, in combination with means for reciprocating the shaft and valve comprising a nut in the upper part of the hydrant and engaging the upper end of the said shaft, and lubricating means in immediate association with the nut and shaft comprising a closed reservoir having a removable cup-shaped bottom part provided with suitable packing through which the shaft reciprocates to prevent water from the stock entering said oil reservoir, the said means for reciprocating the shaft being removable from the upper part of the hydrant to provide a clearance aperture sufficiently great to permit the cup-shaped part of the oil reservoir to be passed to or from the reservoir for purposes of assembly or repairs.

7. In a fire hydrant having stock and bonnet parts, combined with a main valve for controlling the flow of water, a shaft for operating the valve, means supported by the bonnet for reciprocating the shaft, lubricating means in immediate association with the shaft and the means for reciprocating it, said lubricating means comprising a cylindrical oil reservoir extending downward from the upper part of the bonnet and having at its lower part a removable cup-shaped closure for holding the oil in direct contact with the shaft and also provided with packing means surrounding the shaft through which said shaft is slidable, said packing preventing water from the stock entering the oil reservoir.

8. A hydrant having stock and bonnet parts, a main valve and a reciprocating valve operating shaft, said bonnet having internal depending means providing an oil reservoir, a passage through said means for said shaft, and packing in said means to prevent the admission of water from the stock to said reservoir.

9. A hydrant having stock and bonnet parts, a main valve and a reciprocating valve operating shaft, said bonnet having internal depending means providing an oil reservoir, a passage through said means for said shaft, packing in said means to prevent the admission of water from the stock to said reservoir, and means for compressing said packing.

10. A hydrant having stock and bonnet parts, a main valve and a reciprocating valve operating shaft, said bonnet having internal depending means providing an oil reservoir, a passage through said means for said shaft, packing in said means to prevent the admission of water from the stock to said reservoir, and means in said bonnet for supplying oil to said reservoir.

11. A hydrant having stock and bonnet parts, a main valve and a reciprocating valve operating shaft, said bonnet having internal depending means providing an oil reservoir, a passage through said means for said shaft, packing in said means to prevent the admission of water from the stock to said reservoir, means for compressing said packing, and means in said bonnet for supplying oil to said reservoir.

12. A hydrant having stock and bonnet parts, a main valve and a reciprocating valve operating shaft, said bonnet having internal depending means providing an oil reservoir, a passage through said means for said shaft, packing in said means to prevent the escape of oil from said reservoir, and a gland member having means in said reservoir for adjusting the compression on said packing.

13. A hydrant having stock and bonnet parts, a main valve and a reciprocating valve shaft, said bonnet having internal depending means providing an oil reservoir, a passage through said means, a screw threaded shaft operating member extending into said depending means and through said reservoir, said shaft comprising a lower main section and an upper tubular section secured thereto and screw threaded to engage the screw threads on the shaft operating member, said tubular section extending through said passage and having its upper end above the reservoir when the valve is closed and adapted to be moved downward when the valve is opened to thus expose the threads on said operating member to the oil in said reservoir.

14. A hydrant having stock and bonnet parts, a main valve and a reciprocating valve shaft, said bonnet having internal depending means providing an oil reservoir, a passage through said means, a screw threaded shaft operating member extending into said depending means and through said reservoir, said shaft comprising a lower main section and an upper tubular section secured thereto and screw threaded to engage the screw threads on the shaft operating member, said tubular section extending through said passage and having its upper end above the reservoir when the valve is closed and adapted to be moved downward when the valve is opened to thus expose the threads on said operating member to the oil in said reservoir, and means for preventing the rotation of said shaft.

15. A hydrant having stock and bonnet parts, a main valve and a reciprocating valve shaft, said bonnet having internal depending means providing an oil reservoir, a passage through said means, a screw threaded shaft operating member extending into said depending means and through said reservoir, said shaft comprising a lower main section and an upper tubular section secured thereto and screw threaded to engage the screw threads on the shaft operating member, said tubular section extending through said passage and having its upper end above the reservoir when the valve is closed and adapted to be moved downward when the valve is opened to thus expose the threads on said operating member to the oil in said reservoir, and means having arms operating in grooves on the stock for preventing the rotation of said shaft.

HERBERT M. LOFTON.